Nov. 29, 1927.
A. L. FABENS
1,651,197
APPARATUS FOR FINISHING METALWARE
Filed June 27, 1925
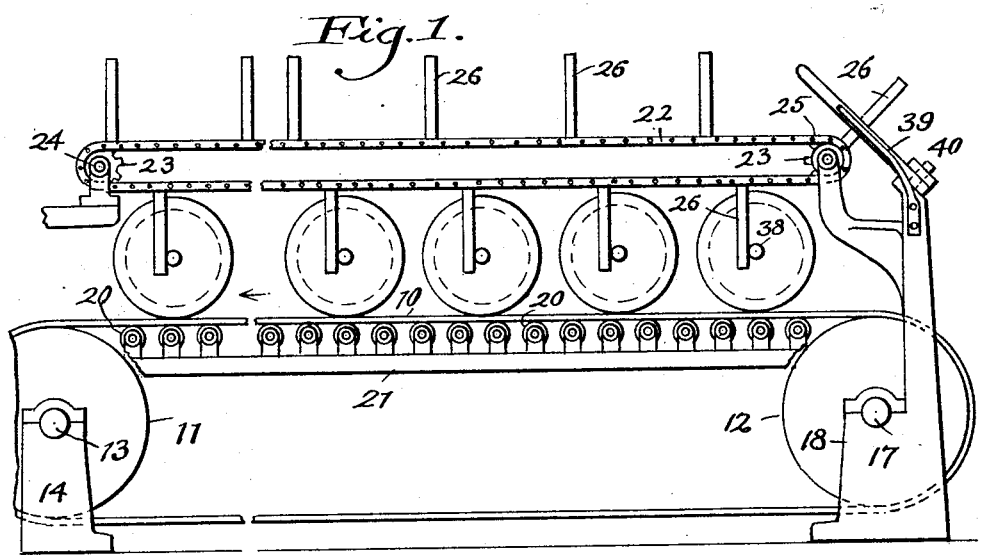
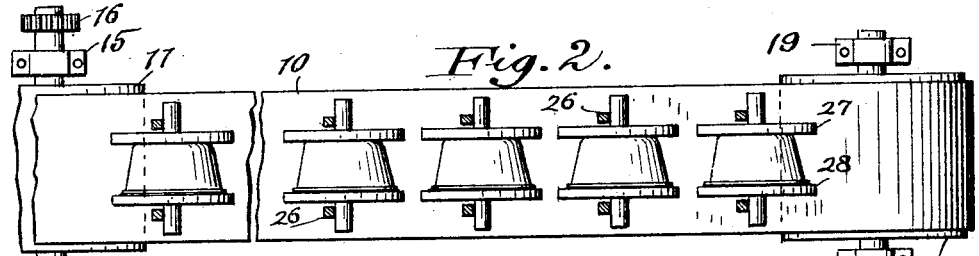
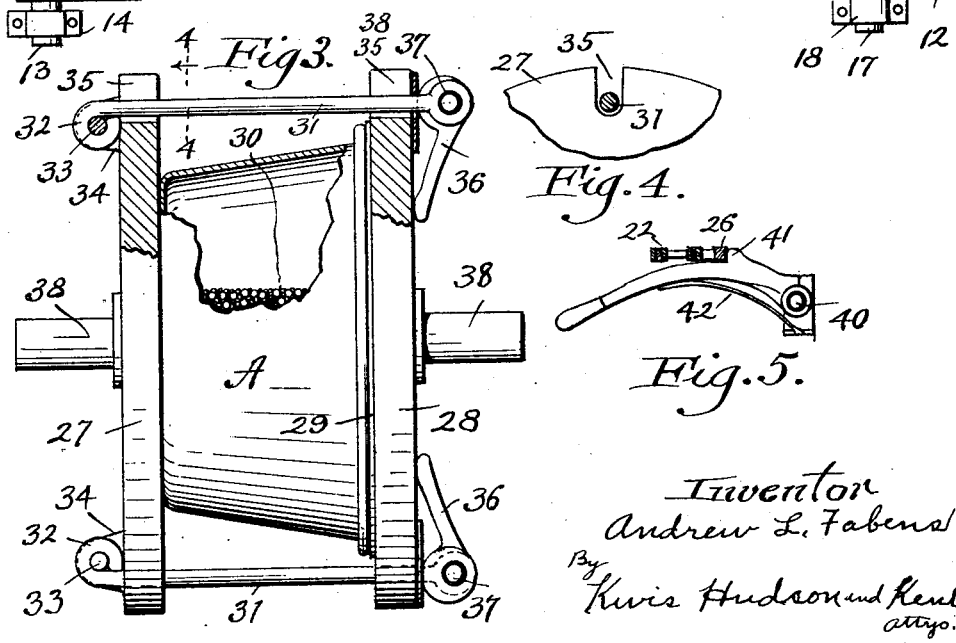
Inventor
Andrew L. Fabens
By
Kwis Hudson and Kent
attys.

Patented Nov. 29, 1927.

1,651,197

UNITED STATES PATENT OFFICE.

ANDREW L. FABENS, OF WOOSTER, OHIO, ASSIGNOR TO THE BUCKEYE ALUMINUM COMPANY, OF WOOSTER, OHIO, A CORPORATION OF OHIO.

APPARATUS FOR FINISHING METAL WARE.

Application filed June 27, 1925. Serial No. 40,122.

This invention relates to an apparatus for finishing the interior surfaces of hollow metal ware such as aluminum cooking utensils and the like, and has for one of its objects the provision of an apparatus for practising, on a commercial scale, the method of finishing as is described and claimed in my copending application, Serial Number 40,123 filed June 27, 1925, in which there is placed in the article a mass of steel balls, together with a cleansing solution and the article rotated for a sufficient time to produce a smooth, hard and bright surface.

A further object of the invention is to provide an apparatus which is adapted to carry out said method as a continuous operation, the articles being mounted in suitable fixtures, and fed into one end of the apparatus and then intermittently moved and rotated so that by the time the article reaches the delivery end of the apparatus, it will have been rotated for a sufficient length of time to produce the desirable results.

Other objects of the invention and the features of novelty will be apparent from the following description taken in connection with the accompanying drawings, of which:

Figure 1 represents a side elevation of one form of apparatus embodying my invention;

Figure 2 is a plan view thereof;

Figure 3 is an enlarged elevation of one of the fixtures in which the articles are mounted, certain parts being shown in section;

Figure 4 is a detail section on the line 4—4 of Figure 3; and

Figure 5 is a plan of the control lever.

Referring to the drawings, 10 indicates an endless conveyor belt which is mounted on the pulleys 11 and 12. The pulley 11 is mounted on a shaft 13 which is supported in the bearing brackets 14 and 15 and carries a gear 16 or other driving device by which the pulley 11 may be driven from any suitable source of power. The pulley 12 is mounted on a shaft 17 that is supported in the bearing brackets 18 and 19 and these brackets may be adjustable, in the usual manner for the purpose of properly tensioning the belt 10. The upper run of the belt 10 is preferably supported between the pulleys 11 and 12 by means of a series of rollers 20 which may be mounted in suitable supports 21 at the opposite ends of the rollers.

In the particular form of the invention illustrated, I arrange above the belt 10, two endless chains 22 which run on sprockets 23 on suitably supported shafts 24 and 25. Each of the chains 22 carries a series of arms 26 and these arms project downwardly from the lower run of the chains.

The article to be finished in accordance with my improved method is indicated at A which represents an aluminum pan that is clamped between the circular blocks or plates 27 and 28, a gasket 29 being arranged on the open side of the pan and being clamped against the rim by means of the plate 28 so as to prevent the escape of the balls and cleansing solution with which the article is substantially filled. I prefer to use balls of about ⅛″ to ⅜″ in diameter and employ a sufficient number of them to fill the article to substantially the level indicated 30. The balls are preferably submerged in a cleansing solution consisting of a suitable soap and water.

The article A is clamped between the plates 27 and 28 by means of rods 31 having eyes 32, at one end, to receive the pivot pins 33 that are mounted in suitable brackets 34 on the plate 27. The periphery of the plate 27 is notched as indicated at 35 to receive the rods 31 and permit them to be swung outwardly when it is desired to disassemble the fixture. Each of the rods 31 carries a cam lever 36 on its other end, these levers being connected with the rods by pivots 37 and forming a convenient means for clamping the fixture on the article A. The plate 28 is provided with notches 38′ similar to the notches 35.

The plates 27 and 28 are provided with the centrally arranged trunnions 38 on their outer sides for a purpose to be hereinafter described. On account of the plates 27 and 28 being circular, they act as wheels for the fixture and permit it to roll.

The belt 10 moves in the direction of the arrow in Figure 1 and the fixtures, with the articles clamped therein, are placed on the belt adjacent the pulley 12. The chains 22 are normally stationary and when a fixture is placed on the belt, it moves therewith until the trunnions 38 strike the first pair of the arms 26. The arms 26 will then serve to hold the fixture relatively stationary, although the continued movement of the belt 10 will cause the fixture to be rotated. The chains 22 may be held by any suitable means and for this purpose I have provided the lever 39 which is pivoted at 40 to a fixed part of the machine. The lever 39 has a lug 41 thereon that is normally arranged in the path of the arms 26 on one of the chains 22, and the engagement of one of these arms with the lug 41 will stop both of the chains. This is clearly shown in Figure 5. A spring 42 is provided to press the lever 39 toward the chains 22 and, when it is desired to place additional fixtures on the belt 10, the lever 39 is drawn away from the chains 22, thereby releasing the lug 41 from the arm 26. The drag of the belt 10 will then move the fixture and the chains 22 until the next arm 26 engages with the lug 41 which will again stop the chains and permit the second fixture to be carried along until its trunnions engage with a second pair of the arms 26. These operations are repeated and, eventually the first fixture will reach the delivery end of the machine and move out onto a table (not shown) after which the fixture may be disassembled.

From the foregoing it will be understood that the belt 10 is operated continuously whereas the chains 22 are operated intermittently. When the chains 22 are stationary, the belt 10 rotates all of the fixtures thereon, and the belt will be of sufficient length to permit each fixture to be rotated for the time required to produce the desired finish in the articles. The belt 10 should travel at a speed from 540 to 620 feet per minute, and each fixture should remain in the apparatus for about 15 to 20 minutes. The length of the belt 10 will, therefore, be determined by the number of fixtures that will be fed into the machine during this time, so that the faster the fixtures are fed into the machine, the longer this belt must be in order to have each fixture rotated for the required time before it reaches the delivery end.

I contemplate using the apparatus, disclosed herein, in combination with other apparatus for returning the balls and the fixtures to the receiving end of the machine, including continuously operating conveyors and means for washing the balls on the return trip, so that the balls and fixtures may be re-used, the whole plant operated continuously.

Having described my invention, I claim:

1. In apparatus of the class described, the combination of a rotatable fixture adapted to carry a hollow article with a mass of balls therein, conveying means on which said fixture is mounted and whereby it is rotated, means for holding said fixture against movement with said conveying means, and means cooperating with said holding means to retain the latter in its holding position with respect to said fixture and to release said holding means to permit movement of said fixture with said conveyor intermittently.

2. In apparatus of the class described, the combination of a rotatable fixture adapted to carry a hollow article with a mass of balls therein, a conveyor for said fixture and on which the fixture is rotated when held against movement with the conveyor, and means for holding said fixture relatively stationary while being rotated.

3. In apparatus of the class described, the combination of a fixture adapted to carry a hollow article with a mass of balls therein, said fixture comprising circular clamping plates and means for clamping them together with the article between them whereby the fixture is adapted to be rolled, a conveyor for said fixture, and means for retarding the movement of the fixture with said conveyor and thereby causing the fixture to be rotated by the conveyor.

4. In apparatus of the class described, the combination of a plurality of fixtures each adapted to carry a hollow article with a mass of balls therein, said fixtures comprising circular clamping plates and means for clamping them together with the article between them whereby the fixtures are adapted to be rolled, a conveyor on which said fixtures are carried, means cooperating with said fixtures and movable therewith when the fixtures are being carried along by said conveyor, and means adapted to intermittently stop the last mentioned means and thereby hold said fixtures so that they will be rotated by said conveyor.

5. In apparatus of the class described, the combination of a plurality of fixtures each adapted to carry a hollow article with a mass of balls therein, said fixtures having circular parts upon which the fixtures are adapted to be rolled, an endless conveyor for said fixtures, means paralleling said conveyor and movable therewith and provided with members engaging said fixtures to hold the latter against movement with said conveyor, and means for intermittently interrupting the movement of the first mentioned means and thereby cause said fixtures to be rotated by said conveyor.

6. In apparatus of the class described, the combination of a plurality of fixtures each adapted to carry a hollow article with a mass of balls therein, said fixtures comprising circular plates and means for clamping them together with the article therebetween, an endless conveyor on which said fixtures are carried with their axes arranged transversely of the direction of movement of the conveyor so as to be adapted to roll thereon, an endless belt paralleling said conveyor and arranged above the latter and having means adapted to engage said fixtures so as to permit rotation of the fixtures, and means for intermittently stopping said belt.

In testimony whereof, I hereunto affix my signature.

ANDREW L. FABENS.